(12) United States Patent
Breban et al.

(10) Patent No.: US 8,416,128 B2
(45) Date of Patent: Apr. 9, 2013

(54) METHOD OF DISPLAYING A RADAR IMAGE

(75) Inventors: Rémi Breban, Saint Aubin de Médoc (FR); Sylvain Marchal, Bordeaux (FR); Thomas Espaignet, Cenon (FR)

(73) Assignee: Thales, Neuilly-sur-Seine (FR)

( * ) Notice: Subject to any disclaimer, the term of this patent is extended or adjusted under 35 U.S.C. 154(b) by 242 days.

(21) Appl. No.: 12/849,848

(22) Filed: Aug. 4, 2010

(65) Prior Publication Data
US 2011/0032140 A1 Feb. 10, 2011

(30) Foreign Application Priority Data
Aug. 4, 2009 (FR) ...................................... 09 03847

(51) Int. Cl.
*G01S 13/00* (2006.01)
(52) U.S. Cl. ........................................ 342/179; 342/176
(58) Field of Classification Search ........... 342/176–186
See application file for complete search history.

(56) References Cited

U.S. PATENT DOCUMENTS

| | | | | | |
|---|---|---|---|---|---|
| 4,305,073 | A | * | 12/1981 | Curry et al. .................... | 342/185 |
| 4,547,803 | A | * | 10/1985 | Richards ........................ | 348/442 |
| 4,697,185 | A | * | 9/1987 | Thomas et al. ................ | 342/185 |
| 5,519,401 | A | * | 5/1996 | Farmer et al. ................. | 342/185 |
| 5,530,450 | A | * | 6/1996 | Sohn et al. .................... | 342/185 |
| 5,867,121 | A | * | 2/1999 | Erickson et al. ............... | 342/185 |
| 6,043,775 | A | * | 3/2000 | Erickson et al. ............... | 342/185 |
| 6,140,955 | A | * | 10/2000 | Andrusiak et al. ............. | 342/185 |
| 6,198,429 | B1 | * | 3/2001 | Fujikawa et al. .............. | 342/176 |
| 7,327,309 | B2 | * | 2/2008 | Wimmer ....................... | 342/185 |
| 7,626,537 | B2 | * | 12/2009 | Andrusiak et al. ............. | 342/177 |
| 2007/0146197 | A1 | * | 6/2007 | Wimmer ....................... | 342/185 |
| 2007/0164899 | A1 | * | 7/2007 | Makkapati et al. ............ | 342/185 |
| 2009/0051583 | A1 | * | 2/2009 | Andrusiak et al. ............. | 342/177 |

FOREIGN PATENT DOCUMENTS
WO 2007/035484 A1 3/2007
* cited by examiner

*Primary Examiner* — Jack Keith
*Assistant Examiner* — Peter Bythrow
(74) *Attorney, Agent, or Firm* — Baker & Hostetler LLP

(57) ABSTRACT

The method of generating an image in the form of a disc portion on a display, the disc portion comprising a center and a maximum radius defining a limit of the image generated, the disc portion comprising a plurality of angular sectors, each angular sector comprising a plurality of disjoint areas, each disjoint area of an angular sector being delimited by two circular arcs defined between two radii, and each disjoint area being called a "ring", is characterized in that it comprises:
  a first step of selecting a ring,
  a second step of comparing the area of the ring with at least one predefined value, dubbed the grain,
  a third step of generating the image of the ring as a function of the result of the comparison,
  a fourth step of incrementing the next ring to be selected.

15 Claims, 6 Drawing Sheets

METHOD OF DISPLAYING A RADAR IMAGE

CROSS-REFERENCE TO RELATED APPLICATIONS

This application claims priority to foreign France patent application No. 0903847, filed on Aug. 4, 2009, the disclosure of which is hereby incorporated by reference in its entirety.

FIELD OF THE INVENTION

The present invention relates to the field of the generation of a radar image or a terrain image which is applied in aeronautical devices intended notably for aircraft. More particularly, the field of the invention relates to the images generated on the basis of a circular scan generating a conical image on a screen.

BACKGROUND OF THE INVENTION

Currently, the images generated in circular-scan displays disposed in cockpits make it possible to display an image decomposed into a plurality of substantially conical parts defined by a distance from a point and an angle. Typically, an image is decomposed into a certain number of angular sectors between two angles $THETA_n$ and $THETA_{n+1}$, the sectors being displayed successively. In each angular sector a ring is defined between two radii $R_p$ and $R_{p+1}$. The remainder of the description will refer to the ring $C_{np}$.

The ring $C_{np}$ therefore comprises a part of the image displayed and refreshed each time that the scan of the display reaches the angle $THETA_n$.

The problem therefore arises of plotting the image in the portion of images which is contained in the ring $C_{np}$.

Today, the computers customarily used comprise a certain performance capability and make it possible to carry out an image plot of a precision that is given on the basis of a defined size of image which must be displayed.

Generally, a choice of configuration of the computer must be made according to the ratio of the performance of the computer to the precision of the plot or else the size of the image.

FIG. 1 represents a conventional display of an image generated by circular scanning. Generally, notably in aeronautical applications, the image generated comprises 512 circular slices and 512 angular sectors 3 which are not all represented in FIG. 1.

The image generated can comprise colour levels, for example relating to a danger level in the case of a TAWS application or relating to environmental conditions in the case of an application of a WXR radar.

The total image is displayed over a radius R and over an angular portion A. The image is therefore composed of a plurality of rings 2. The position of each ring may be tagged by a double index n p, designating a radius and an angle included in the angular portion.

One of the major problems of display by way of a linear or circular scan of a conical image is the availability of the necessary computational resource.

In the existing devices the plotting of an image is carried out essentially by a function which determines which pixels are the ones which belong to the ring. This analysis is expensive in terms of computation time since it carries out a pixel-by-pixel analysis.

In the case of a TAWS application, each ring comprises a colour representing a relative danger level in proximity to the relief.

A problem with the generation of the images according to the prior art techniques is that according to the size of the ring, the computational power required to generate a conical image on the basis of the radar image transmitted in the form of a rectangular matrix is expensive and does not adapt to the size of the ring. Outside according to the size of the ring which may be less than a pixel, of the order of a pixel or larger than a pixel, the mode of computation of the plot of the image remains the same. No adaptation of the plot of the image according to the size of the rings to be displayed exists.

SUMMARY OF THE INVENTION

The invention makes it possible to alleviate the aforementioned drawbacks.

The invention makes it possible to alleviate this problem by evaluating a plot of a rectangular envelope specific to each ring of a conical image so as to compare it with a reference area, called the grain.

According to the values of the compared areas, the method of the invention makes it possible to compute:
  either the plot of the ring on the basis of a function making it possible to determine which pixels belong to the ring;
  or the plot of an approximation of the plot of the ring by the predefined rectangular envelope and specific to each ring.

Thus, the invention makes it possible to configure a variable, called the grain, which makes it possible to generate a conical image while optimizing, according to the application, the best compromise between computational power, the size of the image to be displayed and the precision of the plot.

Advantageously, the method of generating an image in the form of a disc portion on a display, the disc portion comprising a centre and a maximum radius defining a limit of the image generated, the disc portion comprising a plurality of angular sectors, each angular sector comprising a plurality of disjoint areas, each disjoint area of an angular sector being delimited by two circular arcs defined between two radii and two straight lines formed respectively by two segments belonging to the two sides of the angular sector, the said areas being called "rings", each of the rings having a predefined and assigned rectangular envelope whose area is substantially close to the area of the ring, characterized in that the method, by means of a computer, comprises:
  a first step of selecting a ring;
  a second step of comparing the area of the rectangular envelope assigned to the selected ring with at least one predefined value, dubbed the grain;
  a third step of generating the plot of an envelope corresponding to the said ring.

Advantageously, the grain is a square area whose side comprises a plurality of pixels.

Advantageously, the grain is a configurable input item of data of the method of the invention.

Advantageously, the image of a ring is monochrome.

Advantageously, if the size of the grain is larger than the rectangular envelope of the ring selected during the computation of the second step, the third step is carried out by means of a first function generating an image whose limits correspond to the plot of the rectangular envelope of the selected ring Advantageously, if the size of the grain is smaller than the rectangular envelope during the computation of the second step, the third step is carried out by means of a second function generating an image whose limits correspond to the plot of the ring.

Advantageously, the first function determines segments of the image belonging to the rectangular envelope of the selected ring, a segment being defined by a horizontal or vertical line portion some of whose pixels belong to the ring.

Advantageously, the first function comprises:
- a step of selecting the first line of the rectangular envelope defining a segment;
- a step of defining a segment corresponding to the selected line;
- a step of selecting the following line and of repeating the previous two steps until the last segment of the rectangular envelope is defined;
- a step of plotting the segments of the image contained in the rectangular envelope of the ring.

Advantageously, the second function determines for each of the pixels of the rectangular envelope of the selected ring, those which belong to the ring, the image generated comprising all the pixels belonging to the ring.

Advantageously, the second function comprises:
- a step of selecting the first line of the rectangular envelope of a ring;
- a step of generating a first segment of the first line comprising pixels belonging to the ring;
- a step of selecting the following line and of repeating the previous two steps until the last line is processed;
- a step of generating the image contained in the ring.

Advantageously, the step of generating a segment comprises:
- a step of selecting the first pixel of the selected line;
- a step of updating the segment to be generated with the selected pixel;
- a step of selecting the following pixel of the selected line and of repeating the previous step, until the last selected pixel is entirely processed.

Advantageously, when all the plots of each ring of an angular sector have been generated, the method comprises a step of generating an image, denoted bitmap, of the angular sector and a step of displaying the image on a display.

Advantageously, when all the plots of each ring of an angular sector have been generated, the method comprises a step of selecting a ring of the following angular sector, the method being repeated.

BRIEF DESCRIPTION OF THE DRAWINGS

Other characteristics and advantages of the invention will become apparent with the aid of the description which follows, given with regard to the appended drawings which represent.

DETAILED DESCRIPTION

Figure 2:
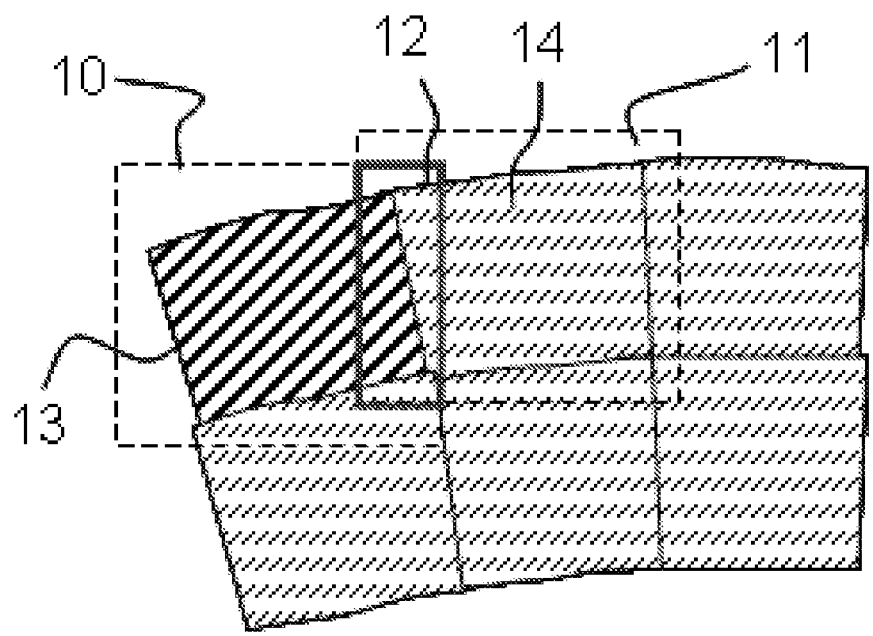
FIG. 2: an overlap of pixels of two successively displayed rectangular envelopes.

FIG. 2 represents the plot of the rectangular envelopes 10 and 11 respectively of the rings 13 and 14. The rectangular envelope is a determined item of data for each of the rings. The rectangular area of a contour forming a rectangle is called an envelope. The rectangular area covers the area of the ring and may be greater than the area of the ring by a few pixels width-wise and length-wise.

When the plot of a ring is approximated by the plot of its rectangular envelope, an overlap 12 can occur. The pixels of the image belonging to the zone of the overlap 12 belong to the two rectangular envelopes of the two rings 10, 11 sharing a side in common.

During a circular scan displaying the image, the pixels included in the overlap zone 12 are displayed successively according to their definition in the rectangular envelope, firstly according to the colour of the ring 13 belonging to the first scanned angular sector and then according to the colour of the ring 14 belonging to the following scanned sector. One and the same pixel belonging to two different rectangular envelopes may therefore change colour during the scan according to the assignment of the colour which is ascribed to it in the approximation of each rectangular envelope.

Figure 3:
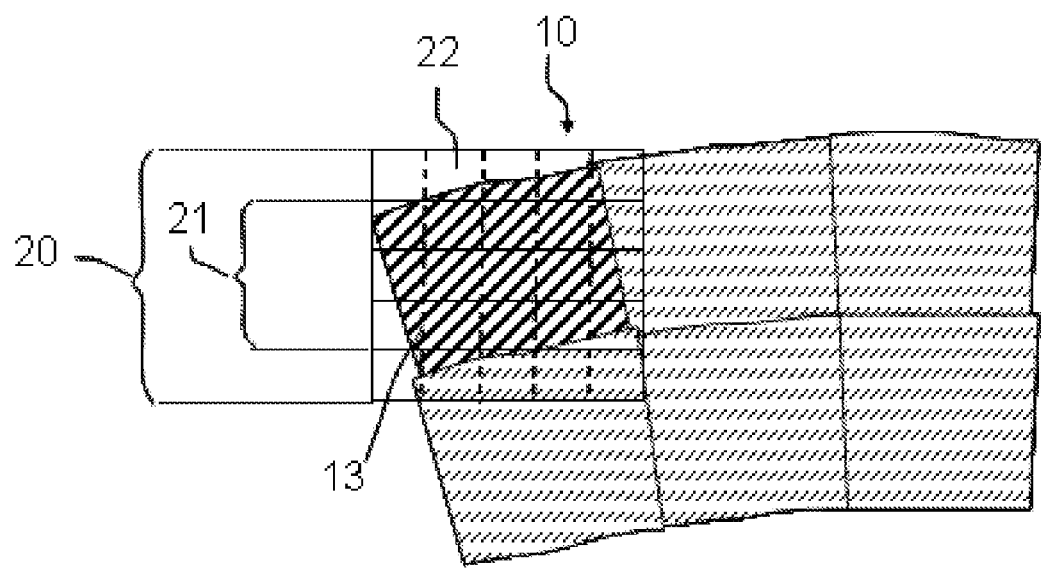
FIG. 3: two examples of defining values of grains according to the invention.

FIG. 3 represents the rectangular envelope 10 of the ring 13 and a cross-ruling comprising areas 22 defining the pixels of the image, notably of the part of the image formed by the ring 13.

The invention makes it possible to define a reference value, called the grain, this value comprises a determined number of pixels and corresponds to an area. In a favoured embodiment, the grain is a value corresponding to a square area.

For example the area comprising 9 pixels forming a 3×3 square is called a grain 3.

In the same manner the area comprising 25 pixels forming a 5×5 square is called a grain 5, termed a high grain.

FIG. 3 represents a grain 3 whose side 21 comprises three pixels and represents a grain 5 whose side 20 comprises five pixels.

Depending on the chosen value of the grain, two cases arise in the method of the invention. The size of the grain may be larger than the size of the rectangular envelope or vice versa.

Figure 1:
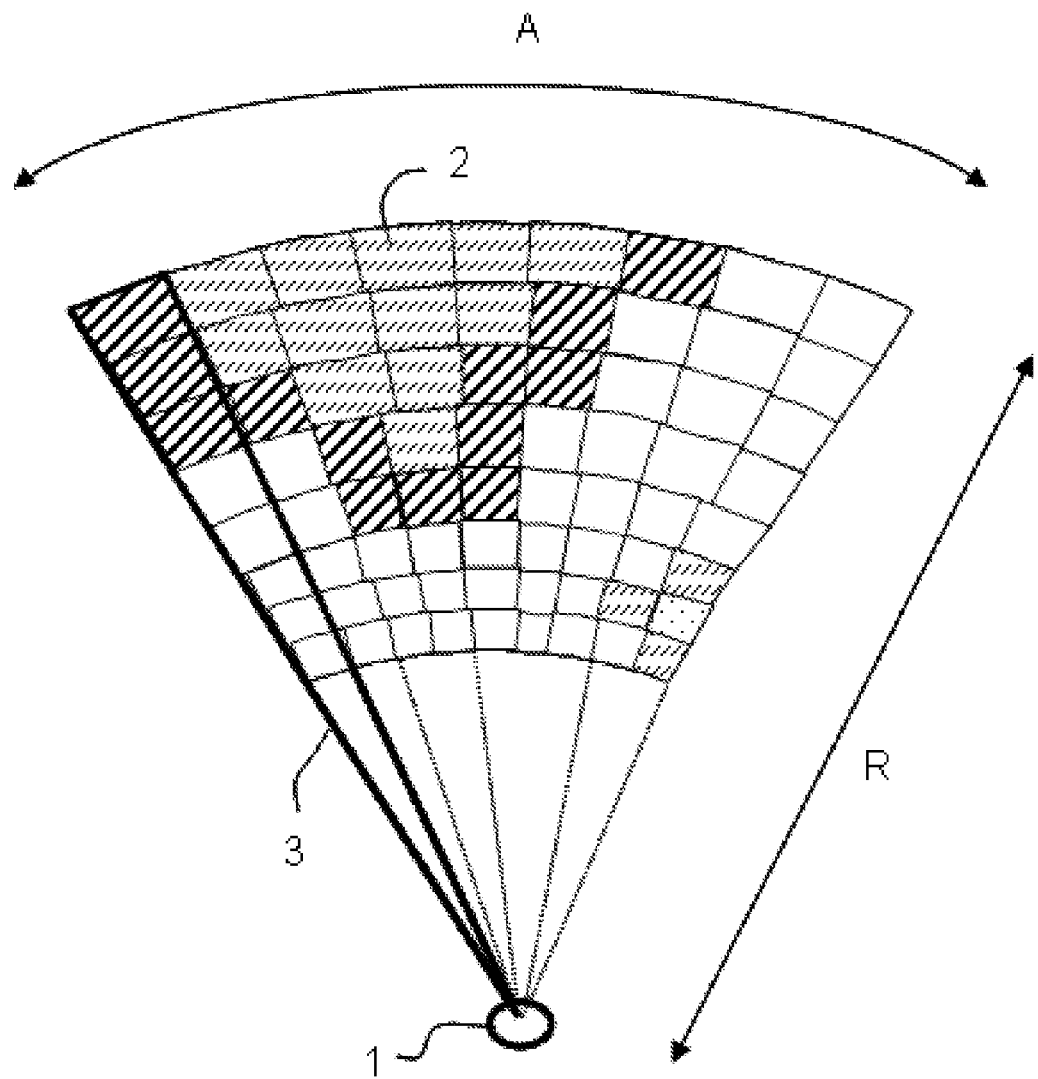
FIG. 1: an image generated by circular scanning according to the prior art.

For example, when the rings, such as represented in FIG. 1, which are close to the centre are considered, their rectangular envelope is smaller than the rectangular envelope of the rings situated at the periphery of the image.

A grain is fixed for the definition of the entire image displayed on the imager.

The method of the invention therefore comprises a step of selecting a ring, denoted $p^{th}$ ring, and a comparison step which makes it possible to compare the size of the rectangular envelope of the $p^{th}$ ring with the size of the grain. The latter step is carried out before the generation of the plot of the image corresponding to the selected ring.

The image comprising a set of images of rings of one and the same angular sector is denoted a "bitmap". The bitmap is transmitted to the display when all the rings of an angular sector have been processed.

Figure 4:
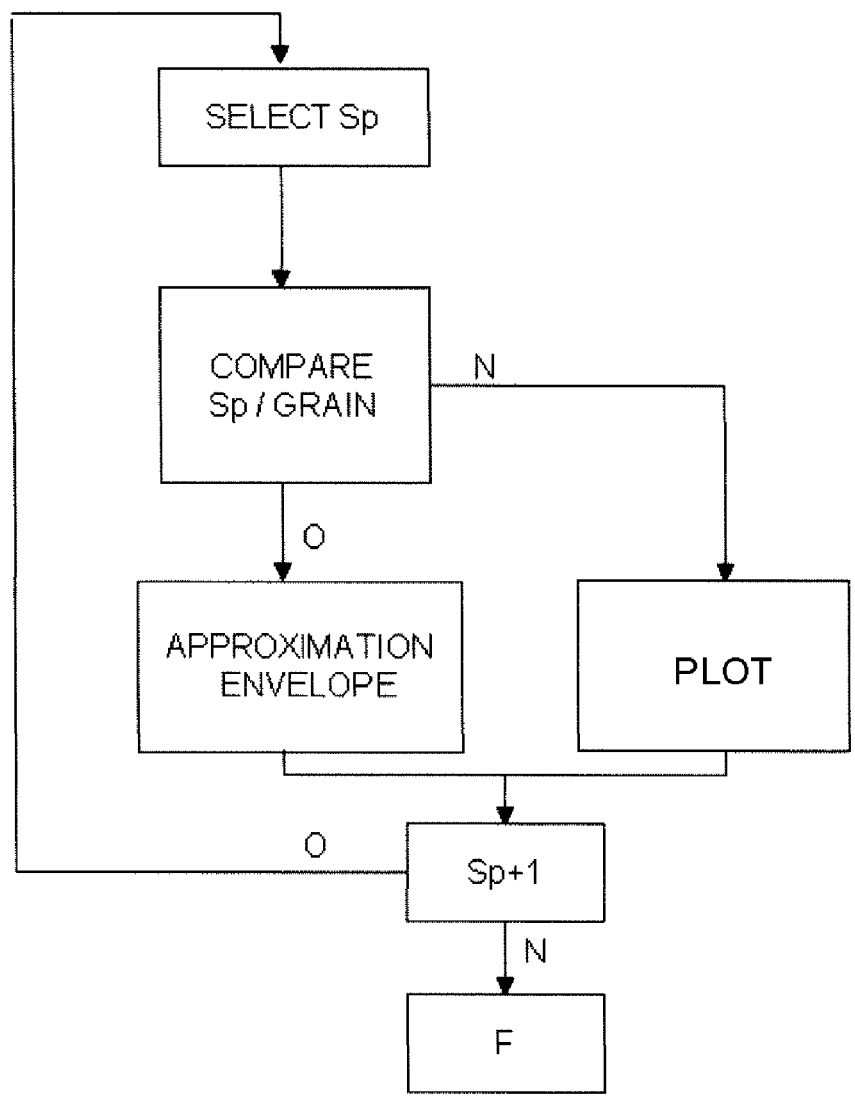
FIG. 4: steps of the method according to the invention making it possible to define the envelope of a ring.

The step of selecting a ring is represented in FIG. 4 by the step SELECT Sp which corresponds to the selection of the $p^{th}$ ring of an angular sector. The comparison step, denoted COMPARE Sp/GRAIN in FIG. 4, follows the selection step. This comparison step therefore makes it possible to compare the rectangular envelope of a ring with the size of the grain.

If the size of the grain is larger than the rectangular envelope of the $p^{th}$ ring, then the method of the invention comprises a third step. This third step, denoted ENVELOPE APPROXIMATION in FIG. 4, invokes a first function which makes it possible to plot the rectangular envelope of the selected ring.

The image of the ring generated in the display is therefore contained in a rectangular envelope such as the envelope 10 or 11 of FIG. 2. The ring is in this case approximated by the rectangular envelope which is predefined. Each ring possesses a predefined rectangular envelope which is assigned to it.

In the latter case, the first function makes it possible to determine the segments of the image belonging to the rectangular envelope whose plot is to be generated.

This first function is less expensive than the second function, described if after, and makes it possible to save computation time. Indeed, the computer does not execute the heavyweight part of the algorithm carrying out the pixel-by-pixel analysis necessary to generate a conical image which generally corresponds to a non-rectangular plot.

Two rectangular envelopes possibly overlapping, certain pixels may be plotted twice as described previously. Consequently, the size of the image generated increases.

In the configuration where the area of the rectangular envelope of the ring is smaller than the value, called the grain, then the method replaces the ring by its rectangular envelope. The plot of the image is therefore an approximation of the plot of the ring by its rectangular envelope.

If the size of the grain is smaller than the rectangular envelope of the selected ring, then the method of the invention comprises a 4th step, called PLOT, which makes it possible to invoke a second function making it possible to determine the plot of the ring.

This second function makes it possible notably to determine which pixels of the rectangular envelope assigned to the $p^{th}$ ring are the ones that belong to the said ring. Notably, this second function makes it possible to determine which segments of the rectangular envelope are the ones that comprise pixels belonging to the $p^{th}$ ring.

Only the segments identified belonging to the ring will be plotted to generate the image of the ring.

This second function therefore makes it possible to construct fewer segments, a check of each position of each of the pixels being carried out so as to ascertain whether it belongs to the $p^{th}$ ring. Therefore, the size of the image generated of the ring is reduced with respect to the image generated contained in the rectangular envelope corresponding to the plot of the first function.

Furthermore, the quality of the image generated is of better quality when plotting on the basis of the second function. The plot is more precise since only the pixels belonging to the ring take the colour of the cell.

The fourth step is called PLOT in FIG. 4.

The method of the invention repeats the second step by selecting another ring, denoted $S_{p+1}$ until the plots of all the rings of the angular sector are generated.

The method is then terminated on the basis of a final step denoted F.

The method may then be looped back for refresh and display of another image of another angular sector.

An advantage of the solution of the invention is to generate a total image having a good compromise between the computational resource used and the size of the image generated as well as its quality.

Indeed, for a given grain value, the smaller the rings and the closer they are to the centre of the imager, the more the rectangular envelope is potentially smaller than the size of the grain and the lower the computational power required to plot the image.

Conversely, the larger the rings and the further they are from the centre of the imager, the more the rectangular envelope is potentially larger than the size of the grain. In this case, the ring is plotted with a high precision, the size of the image generated in the ring is smaller than if it were generated in the rectangular envelope and finally the computational power required is more significant.

Depending on the applications, the value of the grain may be configured so as to determine the best compromise between the size of the image, the computational power and the precision of the plot.

Figure 5:
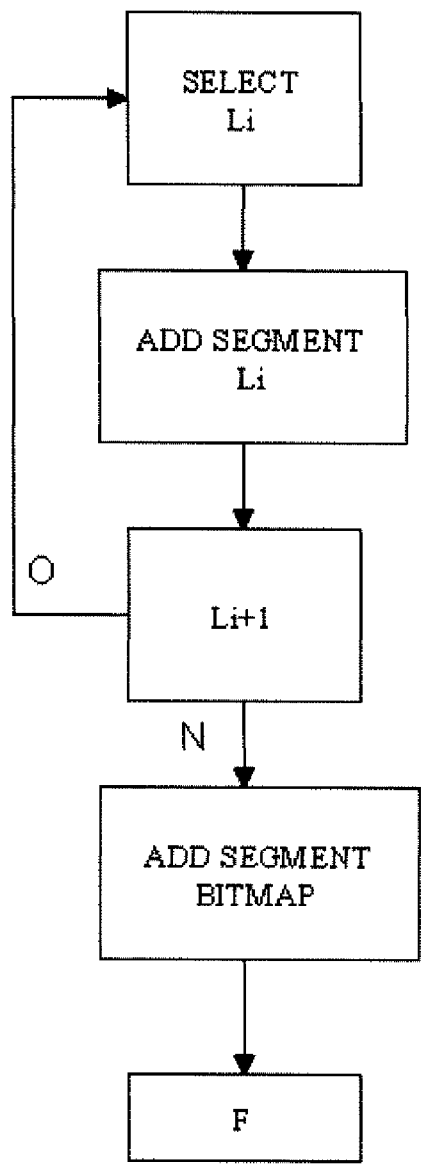
FIG. 5: steps of the method according to the invention making it possible to carry out the approximation of the ring by a rectangular envelope.

FIG. 5 represents the sequencing of the detailed steps carried out by the first function of the ENVELOPE APPROXIMATION step. The first function carries out an approximation of the plot of the ring by replacing it with its rectangular envelope and generates an image included in this envelope.

A first step carried out by the first function is to select a line of the rectangular envelope of the $p^{th}$ ring, beginning with the first line of the rectangular envelope. This step is denoted SELECT $L_i$ in FIG. 5.

A second step is to define a segment of pixels of the selected line whose size is equal to the length joining the two opposite sides of the rectangular envelope.

A third step of the implementation of the first function is to determine whether the envelope comprises another line $L_{i+1}$ consecutive to the line undergoing processing.

If this is the last line of the ring, then a computer adds the segments constituting the processed envelope to those of the other envelopes belonging to the angular sector.

If on the other hand this is not the last line of the ring then the function increments the line of the rectangular envelope to be processed.

Finally, the implementation of the task of the first function comprises a last step denoted F in FIG. 5 when the analysis of the segments of the envelope is terminated.

Figure 6:
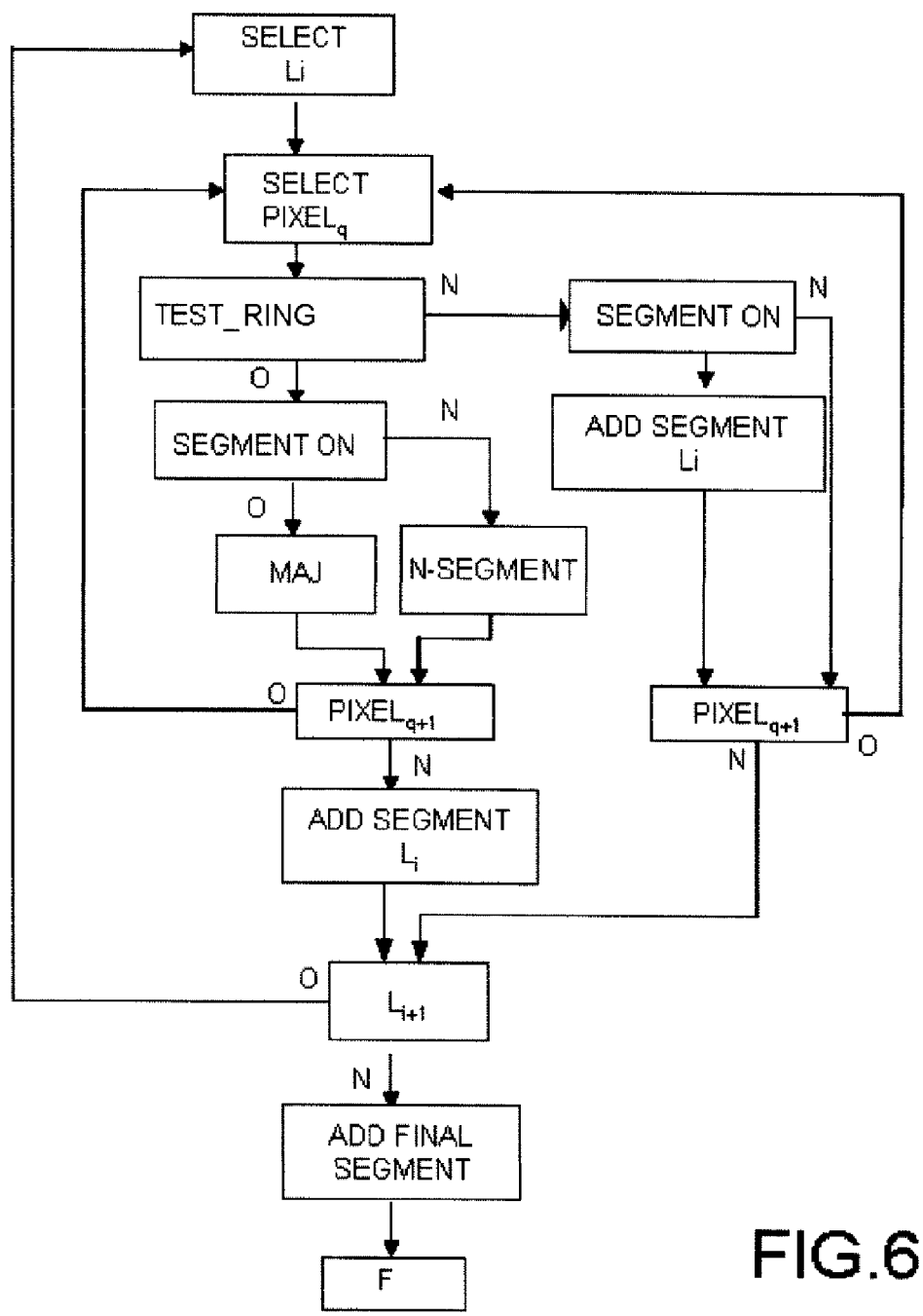
FIG. 6: steps of the method according to the invention making it possible to carry out the plot of the ring.

FIG. 6 represents the chart of sequences of the tasks carried out by the second function of the PLOT step.

The second function selects a line of the rectangular envelope of the $p^{th}$ ring beginning with the first line and performs a processing for each line of the rectangular envelope until the last line.

The first step, denoted SELECT $L_i$, of the task carried out by the second function is to select a line of the rectangular envelope of a ring. Let us consider the processing of the line $L_i$ of the $p^{th}$ rectangular envelope of a ring of the generated image.

A second step, denoted SELECT $PIXEL_q$, carried out by the second function, comprises the selection of a pixel of the line.

A third step, denoted TEST_RING, of determining the position of the pixel makes it possible to determine whether the pixel belongs to the ring.

If the pixel belongs to the ring, the second function carries out a fourth step, denoted SEGMENT ON, of analyzing whether a segment is already defined for this line. If the segment already exists, that is to say some pixels of the ring belong to the segment, then the size of the segment is adjusted with the pixel selected in a fifth step. This fifth step is denoted MAJ.

If, on the other hand, the segment is not defined, the second function creates a new segment in a sixth step, denoted N_SEGMENT.

Finally the second function carries out a seventh step, denoted $PIXEL_{q+1}$, which determines whether there is still another pixel in the line. If there is it returns to the second step of selecting the next pixel, otherwise in eighth step, denoted ADD SEGMENT $L_i$, the second function generates the segment corresponding to the line $L_i$ of the $p^{th}$ ring. Each of the pixels of the segment belong to the ring.

In a thirteenth step, denoted $L_{i+1}$, the second function determines whether there is still another line to be processed in the $p^{th}$ rectangular envelope of the ring.

On completion of the third step, if the pixel does not belong to the ring, the second function carries out a tenth step, denoted SEGMENT ON, of analyzing whether a segment is already defined. If the segment already exists, then the second function carries out an eleventh step, denoted ADD SEGMENT $L_i$, of adding the segment to the image, otherwise the second function carries out a twelfth step, denoted PIXEL$_{j+1}$, of determining the next pixel to be processed.

If there are still pixels to be processed on the line, the second function returns to the second step, otherwise it continues the thirteenth step comprising the determination of the next line to be processed.

If there is still another line to be processed, then the second function carries out the first step SELECT $L_i$ of selecting the next line, otherwise it adds the last segment of the image of the rectangular envelope of the $p^{th}$ ring in a fourteenth step, denoted ADD FINAL SEGMENT.

Finally a last step, denoted F, makes it possible to determine the end of the task of the second function.

An advantage of the invention is to be able notably to configure, according to the applications, the size of the grain so as to respond to the best compromise between computational power, the size of the image to be displayed and the precision of the plot.

In one case of implementation the size of the grain may be zero, in which case the second function will generate the plot of each ring of the image, to the detriment of the performance of the computer.

In another configuration, it is possible to parametrize a high grain in such a way that the first function generates a plot of each ring by approximating its contour by a rectangular envelope. In the latter typical case, each ring displayed is replaced with a rectangular envelope, to the detriment of the bitmap size and of the quality of the image generated.

The invention possesses the advantage of proposing a high flexibility depending on the application making it necessary to display a conical image comprising a plurality of rings such as defined previously and according to the context of use of this application.

In the case of a definition of a grain of mean size, the conical image generated is of hybrid type, that is to say:
that a first set of rings are plotted according to their original contour so as to obtain a precise plot, a reduced plotted image size, the pixels being plotted once only, and a computational resource requiring fewer computations than if all the rings of the image were generated in this way;
that a second set of rings are replaced with their predefined rectangular envelope so as to generate an image which is less expensive in terms of computational power.

The invention claimed is:

1. A computer-implemented method of displaying an image on a display formed by squared pixels, representing a first image generated by circular scanning, the method comprising
a step of defining a disc portion on a display, the disc portion comprising a centre and a maximum radius defining a limit of the image generated, the disc portion further being divided into a plurality of angular sectors, each angular sector being divided into a plurality of disjoint areas, each disjoint area of an angular sector being delimited by two circular arcs defined between two radii and two straight lines formed respectively by two segments belonging to the two sides of the angular sector, the said areas being called "rings", wherein each of the rings has a predefined and assigned rectangular envelope whose area covers the area of the ring; and
a step of defining at least a grain corresponding to a first squared area defined by a predetermined number of said pixels;
the method further comprising, for each ring:
a step of defining a rectangular envelope formed by at least one of said pixels, the rectangular envelope surrounding the ring;
a step of comparing a size of a second area delimited by the rectangular envelope and a size of the grain;
a step of generating a plot of the ring comprising the pixels delimited by the rectangular envelope if the size of the grain is larger than the size of the second area and comprising the pixels delimited by the rectangular envelope and belonging to the ring if the second area is larger than the size of the grain; and
a step of generating an image of said ring by means of the pixels contained in the plot;
the method further comprising when all the plots of each ring of an angular sector have been generated:
a step of generating an image, denoted bitmap, of the angular sector, and
a step of displaying the image on the display;
wherein the steps are performed by a computer programmed to perform the steps.

2. A method of generating an image in the form of a disc portion according to claim 1, wherein the grain is a square area whose side comprises a plurality of pixels.

3. A method of generating an image in the form of a disc portion according to claim 1, wherein the grain is a configurable input item of data.

4. A method of generating an image in the form of a disc portion according to claim 1, wherein the image of a ring is monochrome.

5. A method of generating an image in the form of a disc portion according to claim 2, wherein if the size of the grain is larger than the rectangular envelope of the ring selected during the step of comparing, the step of generating the plot of the ring is carried out by means of a first function generating a plot whose limits correspond to the plot of the rectangular envelope of the selected ring.

6. A method of generating an image in the form of a disc portion according to claim 3, wherein if the size of the grain is larger than the rectangular envelope of the ring selected during the step of comparing, the step of generating the plot of the ring is carried out by means of a first function generating a plot whose limits correspond to the plot of the rectangular envelope of the selected ring.

7. A method of generating an image in the form of a disc portion according to claim 2, wherein if the size of the grain is smaller than the rectangular envelope during the step of comparing, the step of generating the plot of the ring is carried out by means of a second function generating a plot whose limits correspond to the plot of the ring.

8. A method of generating an image in the form of a disc portion according to claim 3, wherein if the size of the grain is smaller than the rectangular envelope during the step of comparing, the step of generating the plot of the ring is carried out by means of a second function generating a plot whose limits correspond to the plot of the ring.

9. A method of generating an image in the form of a disc portion according to claim 5, wherein the first function determines segments of the image belonging to the rectangular envelope of the selected ring, a segment being defined by a horizontal or vertical line portion some of whose pixels belong to the ring.

10. A method of generating an image in the form of a disc portion according to claim 9, wherein the first function comprises:
a step of selecting the first line of the rectangular envelope defining a segment,
a step of defining a segment corresponding to the selected line,
a step of selecting the following line and of repeating the previous two steps until the last segment of the rectangular envelope is defined,
a step of plotting the segments of the image contained in the rectangular envelope of the ring.

11. A method of generating an image in the form of a disc portion according to claim 8, wherein the second function determines for each of the pixels of the rectangular envelope of the selected ring, those which belong to the ring, the image generated comprising all the pixels belonging to the ring.

12. A method of generating an image in the form of a disc portion according to claim 11, wherein the second function comprises:
a step of selecting the first line of the rectangular envelope of a ring,
a step of generating a first segment of the first line comprising pixels belonging to the ring,
a step of selecting the following line and of repeating the previous two steps until the last line is processed,
a step of generating the image contained in the ring.

13. A method of generating an image in the form of a disc portion according to claim 12, wherein the step of generating a segment comprises:
a step of selecting the first pixel of the selected line,
a step of updating the segment to be generated with the selected pixel,
a step of selecting the following pixel of the selected line and of repeating the previous step, until the last selected pixel is entirely processed.

14. A method of generating an image in the form of a disc portion according to claim 1, wherein when all the plots of each ring of an angular sector have been generated, the method comprises a step of generating an image, denoted bitmap, of the angular sector and a step of displaying the image on a display.

15. A method of generating an image in the form of a disc portion according to claim 1, wherein when all the plots of each ring of an angular sector have been generated, the method comprises a step of selecting a ring of the following angular sector, the method being repeated.

* * * * *